Nov. 18, 1952

R. M. ROSSEL 2,618,593

APPARATUS FOR CLEANING STERILIZING, AND
DRIVING DENTAL DRILL BURRS

Filed July 14, 1949

Inventor
Roy M. Rossel

By W. S. McDowell

Attorney

Patented Nov. 18, 1952

2,618,593

UNITED STATES PATENT OFFICE 2,618,593

APPARATUS FOR CLEANING, STERILIZING, AND DRYING DENTAL DRILL BURRS

Roy M. Rossel, Upper Sandusky, Ohio

Application July 14, 1949, Serial No. 104,636

2 Claims. (Cl. 204—199)

The present invention is concerned with apparatus for cleaning, drying and sterilizing relatively small metallic objects, particularly metallic drill burrs or bits of the type used in dental drilling machines or apparatus.

It is the primary object of the present invention to provide a mechanically efficient apparatus which is capable of thoroughly cleaning and removing foreign matter from the burrs or drill bits used in dental drilling apparatus, and which also functions in a facile manner to quickly and thoroughly sterilize and dry such burrs or bits after cleaning operations to render the same ready for immediate use.

In the past, considerable difficulty has been encountered in thoroughly cleansing drill burrs of the type used in the drilling and finishing of teeth or artificial dentures. The primary difficulty had in efficiently cleaning such burrs stems from the fact that minute particles of material during drilling operations become deposited within and clog the recesses and cavities of the drill burr or bit, and tenaciously cling to the same in a manner which precludes efficient cleaning of the burr surfaces.

In usual practice, after drilling operations, the drill burrs are removed from the burr-carrying instrumentality of the drill and placed within a suitable antiseptic cleaning solution. In some cases, it is necessary to vigorously brush the burr surface in an effort to remove foreign matter therefrom, but it will be manifest that such brushing and the introduction of the burrs within a cleaning solution, in most instances, is a tedious and relatively inefficient means of thoroughly cleaning such drill burrs, and consequently, it is usual that the drill burrs become progressively clogged to the extent that the same are no longer efficient for their intended usage and must be discarded.

It is, therefore, another object of the present invention to provide an apparatus which embodies a rotary spindle which is housed within a closed receptacle and on which may be carried a number of drill burrs to be subjected to relatively low speed rotation within a suitable electrolytic cleaning and sterilizing solution to mechanically wash the burr surfaces, while at the same time subjecting the burrs to an electrolytic cleaning operation by the passage of electrical current through the solution contained in the receptacle whereby to thoroughly and efficiently remove all foreign matter from the outer surfaces of such drill burrs.

Still a further object of the present invention is to provide an apparatus of the character described which comprises a sealable receptacle for the reception of an electrolytic cleaning and sterilizing solution and in which is rotatably mounted a burr-receiving spindle which is subject to relatively low speed rotation within the cleaning solution, and which provides for the passage of electrical current through the electrolytic cleaning and sterilizing solution during rotation of the burrs therein to effect the complete removal of any foreign matter from the outer surface of the drill burr, such apparatus further functioning as a rotary drying device for the drill burrs after cleaning operations through a novel arrangement of parts permitting of the raising of the burr-receiving spindle above the level of the cleaning solution after cleaning operations and imparting thereto relatively high speed rotation to completely remove liquids from the burrs and efficiently dry the same.

For a further and more detailed understanding of the present invention and the various additional objects and advantages derived therefrom, reference is made to the following description and the accompanying drawings, wherein.

Figure 1:
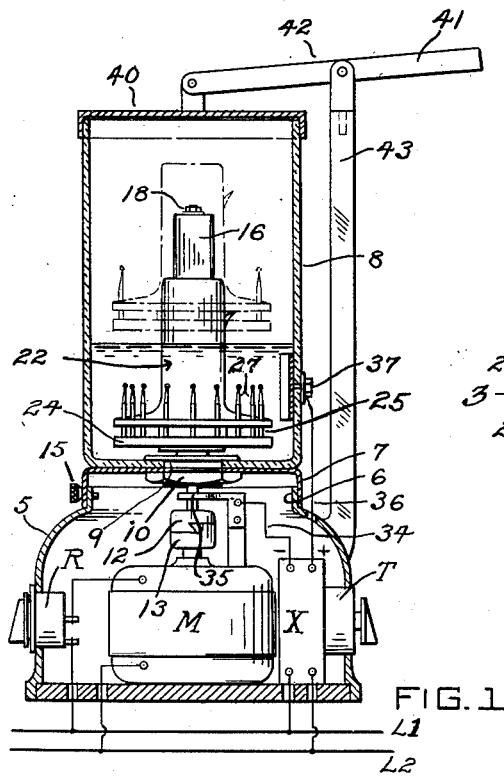
Fig. 1 is a medial vertical sectional view taken through a drill burr cleaning machine formed in accordance with the present invention.
Figure 6:
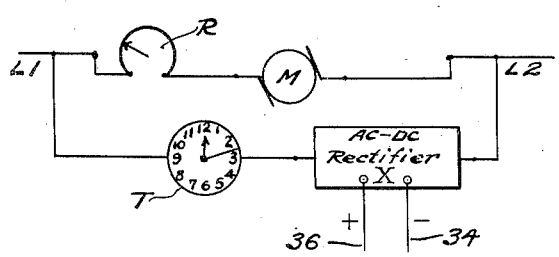
Fig. 6 is a diagrammatic view of the electrical circuit employed in the present apparatus.

Referring now to the drawings, the numeral 5 designates generally a hollow cubical base member in which is housed an electrical induction motor M, a rheostat R connected in series with the motor M for controlling the speed of operation thereof, an A. C.-D. C. rectifier X connected in parallel with the motor M, and a manually adjustable time control switch T connected in series with the rectifier X in a manner to control the time interval of operation of the rectifier. As indicated in Figs. 1 and 6 of the drawings, the electrical apparatus associated with the present cleaning and drying machine may conveniently be supplied operating current through the power lines L-1 and L-2 connected with a suitable source of alternating current, such as the usual household 110 v. 60 cycle circuit. The base 5 at its upper end is formed with an open mouth which is defined by an upper circular flange 6 which frictionally receives about its outer surface a metallic skirt portion 7 which is secured to the under side of an open-topped receptacle 8, preferably formed from glass or other suitable dielectric material. The skirt portion 7 is secured to the bottom of the receptacle 8 by means of a screw-threaded bearing post 9 which preferably is formed from a suitable dielectric synthetic resinous material, and which is formed at one end with a cylindrical shank portion 9-a, an intermediate diametrically enlarged flange portion 9-b overlapping the inner bottom of the receptacle, and a threaded end portion 9-c. The threaded end portion 9-c of the post 9 extends through an opening formed in the skirt portion 7 and engages a cooperatively screw-threaded clamping nut 10 disposed below the skirt 7. In this manner, it will be seen that a relatively tight-fitting seal or connection may be obtained between the depending skirt portion 7 and the bottom wall of the receptacle, and due to the physical nature of the post material itself, a suitable liquid-tight seal may be had between the bearing post and the opening formed in the lower wall of the receptacle 8.

The post is provided with an axially disposed bore which rotatably receives a shaft 11 which extends through the length of the post 9. At its lower end, the shaft 11 is provided with a diametrically enlarged clutch-type lug 12 which is engaged by a cooperatively shaped dielectric driving lug 13 carried upon the drive shaft 14 of the motor M. The driving connection provided by the cooperative lugs 12 and 13 provides for disconnection between the shaft 11 and the drive shaft of the motor M, in order that the receptacle 8, its skirted portion 7, and the post and shaft 11 may be removed as a unit from the base housing 5. If desired, the frictional fit between the skirt 7 and the flange 6 of the base may be supplemented by a positive locking means, such as a set screw, as indicated at 15.

Figure 3:
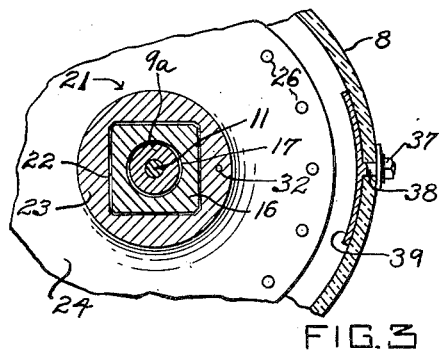
Fig. 3 is a fragmentary horizontal sectional view taken along the line 3—3 of Fig. 2.
Figure 4:
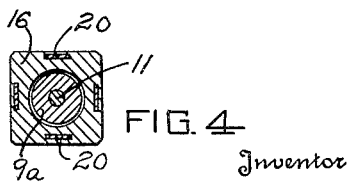
Fig. 4 is a horizontal sectional view taken along the line 4—4 of Fig. 2.

Rotatably carried upon the cylindrical shank portion 9-a of the post is a tubular sleeve member 16 of dielectric material which possesses a generally square cross-sectional configuration (Figs. 3 and 4) and which is formed with a circular bore 17 of slightly larger diameter than the shank portion 9-a of the post. The sleeve 16 is closed at its upper end by an end wall 16-a in which is formed a rectangular opening through which the upper end portion of the shaft 11 passes. Advantageously, the upper end portion of the shaft 11 is formed a distance below its outer end with a rectangular region 11-a whereby a non-rotative connection may be maintained between the shaft and the sleeve 16. Additionally, the outermost end of the shaft 11 is screw-threaded and receives a cooperatively threaded nut 18 which functions, in association with a retaining collar 19 carried below the end wall 16-a, to securely clamp the sleeve 16 to the shaft 11 and thereby secure the sleeve for rotation with the shaft. At its lower end, the sleeve 16 is open and terminates in an enlarged flange 16-b which provides a bearing surface between the sleeve and the flange 9-b of the post 9.

Figure 2:
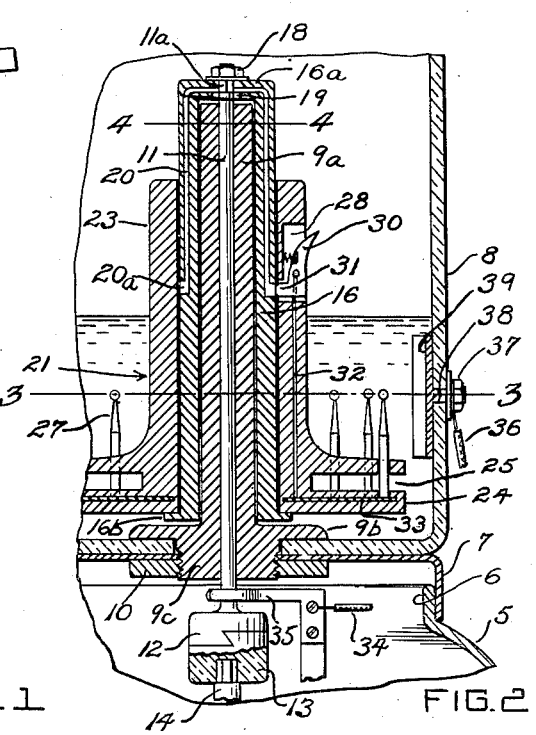
Fig. 2 is an enlarged vertical sectional view taken through the burr-receiving spindle and its supporting post member.

Embedded in the upper end portion of the sleeve 16 is a four-pronged metallic contact member 20 which is formed to provide an upper cross piece within the end wall 16-a of the sleeve which is maintained in engagement and electrical contact with the metallic shaft 11. The four prongs of the contact member 20 extend downwardly within the side walls of the sleeve 16 and terminate in outwardly projecting contact points 20-a which lie flush with the outer side surfaces of the sleeve 16. As shown in Fig. 2, the points 20-a are exposed at the sides of the sleeve at approximately one-half the length of the sleeve.

Figure 5:
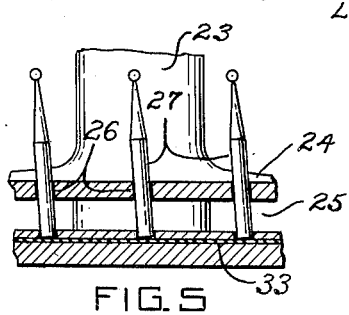
Fig. 5 is an enlarged fragmentary vertical sectional view taken through the lower portion of the drill or burr-receiving spindle of the present apparatus and showing the relative position of the burrs with respect to the rotary spindle.

Slidably and removably carried upon the outer rectangular surface of the sleeve 16 is a rotary spindle 21 which is formed with an axially disposed rectangular bore 22 which provides for longitudinal sliding movement of the spindle upon the outer surface of the sleeve, but which precludes relative rotation therebetween. The spindle 21 is formed with an upper cylindrical shank portion 23 and a lower relatively enlarged and circular skirt portion 24 which is recessed, as at 25, to provide separate circular bit-receiving sections. The skirt portion 24 of the spindle is provided with a series of circumferentially spaced bit or burr-receiving openings 26 which, as shown particularly in Fig. 5 of the drawing, have their axes inclined with respect to the longitudinal axis of the spindle in a manner providing for the inclination of the burrs 27 received therein in the direction of rotation of the spindle. Such inclination of the individual burrs or bits serves to prevent the same from becoming loosened within, or falling out of, the openings 26 during rotation of the spindle within the cleaning solution contained in the lower portion of the receptacle 8.

The shank portion of the spindle 21 is recessed at its upper end portion, as at 28, to receive a spring pressed latch member 30 which is pivotally secured to the walls of the spindle, and which is provided at one end with a metallic contact point 31 which extends through the wall of the spindle for engagement and electrical contact with any one of the contact points 20-a. Electrically connected with the latch member 30 through the pivot thereof, as by means of the wire 32, is an annular contact plate 33 which is embedded within the lowermost circular skirt portion 25 of the spindle and provides a bottom wall for the burr-receiving openings 26.

Electrically connected with the negative pole or terminal of the rectifier X, as by means of the lead wire 34, is a brush-type contact member 35 which is spring pressed into engagement with the shaft 11 immediately above the lug 15 thereof. The positive terminal of the rectifier X is connected, by way of a lead wire 36, with a clamp-type terminal 37 disposed exteriorly of the side wall of the receptacle 8, the terminal 37 having a shank portion 38 which extends through an opening formed in the side wall of the receptacle and terminates in a relatively enlarged arcuate electrode plate 39 disposed interiorly of the receptacle and in close engagement with the inner side wall thereof. Thus, upon operation of the rectifier X, a circuit is completed through the lead 36, to the electrode plate 39, through an electrolytic solution contained in the bottom of the receptacle, to the burrs 27, the plate 33, the lead 32, the latch member 30, one of the points 20-a of the member 20, the shaft 11, the brush 35, and thence through the lead 34 to the negative terminal of the rectifier. When the receptacle is filled to approximately one-third its depth with a suitable electrolytic cleaning and sterilizing solution, for example, a solution of ethyl alcohol and sodium nitrate, or bichloride of mercury, a circuit may be completed between the burrs 27 and the electrode plate 39. Thus, during rotation of the spindle 21 and the burrs contained therein, and during operation of the rectifier X, current is caused to flow between the individual burrs and the plate 39 to effect the efficient cleaning of the burr surfaces by both mechanical agitation and electrolytic action. The time control switch T, as previously stated, is connected in series with the rectifier X in order that the time interval of operation of the rectifier may be controlled in accordance with the period desired for electrolytic cleaning or polishing of the burrs. This provision is made to prevent excessive electrolytic action and the over-heating of the electrolytic solution, in the event that the cleaning apparatus is neglected or unattended. Normally, a relatively short period of operation of the rectifier provides for the removal of any foreign matter from the outer surfaces of the burrs without materially affecting the metal surfaces thereof. It will be noted that rotation of the spindle 21 during passage of current through the electrolytic solution contained in the receptacle 8 causes each burr carried on the spindle to be alternately brought into relatively close relation to the plate 39 and thereafter, on continued rotation, to be moved further away from the plate 39. Due to the fact that the current follows the path of least resistance through the solution, the individual burrs, when approaching their closest position to the plate 39, will be subjected to a more rapid cleaning operation than when occupying a position on the side of the spindle opposite to the plate 39. Thus, in effect, a pulsated cleaning action takes place which also tends to more efficiently and quickly remove foreign matter disposed upon the burr surfaces.

After a predetermined time interval of operation within the electrolytic cleaning solution, the motor M is stopped and the sealable lid 40 of the receptacle 8 is removed by depressing the outer handle 41 of a lever 42 which is pivotally carried upon a bracket 43 secured at its lower end to the base 5, whereupon the spindle 21 may be lifted upwardly upon the rectangular outer surface of the sleeve to a position where the latch member 30 clears the upper end of the sleeve and springs inwardly to provide an abutment which functions to maintain the spindle in a relatively elevated position upon the sleeve, with the lower skirt portion and drill burrs disposed above the level of the electrolytic solution, as shown by broken lines in Fig. 1. At this time, the cover or lid 40 may be replaced upon the open end of the receptacle to provide a seal to prevent evaporation of the electrolytic cleaning solution, and the motor M started and permitted to run at a relatively greater speed by adjustment of the rheostat R to effect a rotary high speed drying of the burrs, and consequent removal of the cleaning solution therefrom. After the drying operation is complete, the spindle containing the cleaned and dried burrs is then removed entirely from the receptacle and placed upon a suitable stationary supporting spindle, not shown, whereby easy access may be had to the thus cleaned and dried burrs.

In view of the foregoing, it will be seen that the present invention provides a highly efficient apparatus for effecting the thorough cleaning, sterilizing and drying of relatively small metallic objects, particularly dental drill burrs, both by mechanical agitation within a cleaning and sterilizing solution and by electrolytic action which function together to effect a complete and thorough removal of all foreign matter from the outer surfaces of the burrs. Apparatus formed in accordance with the present invention is characterized by its mechanical efficiency, ease of operation, relative simplicity of construction and consequent economy of manufacture.

While a single preferred embodiment of the present invention has been disclosed in detail, it will be manifest that various modifications may be resorted to without departing from the scope of the following claims, it being evident that the rectifier system X may be replaced by any suitable source of direct current, and that the details of construction with regard to the closure lid and particular configuration of the apparatus may be modified while retaining the spirit of the present invention.

I claim:

1. Apparatus for cleaning and sterilizing dental drill burrs comprising a base; a dielectric receptacle detachably carried on said base and having mounted therein a substantially vertical axially disposed rotary post and adapted for the reception of an electrolytic sterilizing solution; an electrical motor in said base; means connected between said post and said motor and extending through said receptacle for drivingly connecting said post with said motor, said last-named means being detachable for removal of said receptacle and said post as a unit from said base; a tubular spindle member carried by said post and movable longitudinally thereon between a lowered position substantially at the bottom of said receptacle and an elevated position intermediate the ends of said receptacle, said spindle member being rotatable with said post in both said lowered and elevated positions and being formed with a plurality of burr-receiving sockets; means carried on said spindle member and engageable with said post for holding said spindle member in its elevated position upon said post, said last-named means serving, upon partial filling of said receptacle with a solution, to maintain said spindle above the level of said solution for drying said burrs by rotation; an electrode carried within said receptacle in spaced relation to said spindle member when the latter occupies its lowered position upon said post; an A. C.-D. C. rectifier having positive and negative terminals and mounted within said base; and means connecting the separate terminals of said rectifier respectively with said electrode and burrs received within the sockets of said spindle member when the latter occupies its lowered position upon said post for passing electrical current between said electrode and such burrs by way of an electrolytic solution contained in said receptacle.

2. Cleaning and sterilizing apparatus for dental drill burrs comprising a dielectric receptacle having side and bottom walls and adapted to receive an electrolytic sterilizing solution; a rotary post member arranged axially of said receptacle and terminating a distance below the upper end thereof; shaft means drivingly connected with said post member and extending through the bottom wall of said receptacle; motor means disposed exteriorly of said receptacle and engageable with said shaft means for driving said post member; a spindle slidable longitudinally on said post member and rotatable therewith, said spindle being formed with a plurality of burr-receiving sockets and having embedded therein a metallic plate for engagement and electrical contact with burrs received in said sockets; an electrode carried upon the inner side wall of said receptacle in spaced relation to said post member; means for connecting said electrode with one pole of a source of direct electrical current having a pair of poles of opposite polarity; means for electrically connecting the metallic plate embedded in said spindle with the opposite pole of the source of direct current during rotation of said spindle, said last-named means providing for passage of electrical current between said electrode, an electrolytic solution contained in said receptacle, and burrs received in the sockets of said spindle, whereby to remove foreign matter present upon the outer surfaces of such burrs by mechanical agitation within said solution and by the action of electrical current passing through said solution.

ROY M. ROSSEL.

REFERENCES CITED

The following references are of record in the file of this patent:

UNITED STATES PATENTS

| Number | Name | Date |
| --- | --- | --- |
| 1,793,798 | Harker | Feb. 24, 1931 |
| 1,928,949 | O'Neill | Oct. 3, 1933 |
| 2,361,680 | Ehrhardt | Oct. 31, 1944 |
| 2,482,486 | Irish | Sept. 20, 1949 |

FOREIGN PATENTS

| Number | Country | Date |
| --- | --- | --- |
| 16,648 | Great Britain | of 1904 |